(12) United States Patent
Uchimura (10) Patent No.: US 11,386,278 B2
(45) Date of Patent: Jul. 12, 2022

(54) PRODUCT MANAGEMENT DEVICE, CONTROL METHOD FOR PRODUCT MANAGEMENT DEVICE, AND PROGRAM

(71) Applicant: NEC CORPORATION, Tokyo (JP)

(72) Inventor: Jun Uchimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 373 days.

(21) Appl. No.: 16/495,354

(22) PCT Filed: Mar. 14, 2018

(86) PCT No.: PCT/JP2018/009955
§ 371 (c)(1),
(2) Date: Sep. 18, 2019

(87) PCT Pub. No.: WO2018/173883
PCT Pub. Date: Sep. 27, 2018

(65) Prior Publication Data
US 2020/0394369 A1 Dec. 17, 2020

(30) Foreign Application Priority Data
Mar. 22, 2017 (JP) .............................. JP2017-056151

(51) Int. Cl.
*G06K 7/10* (2006.01)
*G07G 1/00* (2006.01)
*H04B 17/318* (2015.01)

(52) U.S. Cl.
CPC ......... *G06K 7/10099* (2013.01); *G07G 1/009* (2013.01); *G07G 1/0072* (2013.01); *H04B 17/318* (2015.01)

(58) Field of Classification Search
None
See application file for complete search history.

(56) References Cited

U.S. PATENT DOCUMENTS

| | | | | |
|---|---|---|---|---|
| 4,907,225 | A | * | 3/1990 | Gulick ............... H04Q 11/0428 370/463 |
| 6,435,407 | B1 | | 8/2002 | Fiordelisi |
| 7,575,162 | B1 | * | 8/2009 | Malchak ............. G07G 1/0054 235/383 |

(Continued)

FOREIGN PATENT DOCUMENTS

| | | | | |
|---|---|---|---|---|
| CA | 2406335 | A1 | * 7/1998 | ............. G16H 20/13 |
| CN | 109829777 | A | 5/2019 | |

(Continued)

OTHER PUBLICATIONS

Communication dated Apr. 14, 2020, issued by the Taiwan Intellectual Property Office in application No. 107108743.

(Continued)

*Primary Examiner* — Fekadeselassie Girma
(74) *Attorney, Agent, or Firm* — Sughrue Mion, PLLC (57) ABSTRACT

A product management device includes: a reception state storage unit configured to, on the basis of changes in reception states of signals transmitted from tag devices attached to products, store identification information of products in which the changes have occurred; and a list output unit configured to output a list of products for which the changes in the reception states are equal to or greater than a threshold value.

5 Claims, 5 Drawing Sheets

(56) References Cited

U.S. PATENT DOCUMENTS

| | | | | |
|---|---|---|---|---|
| 8,286,868 | B2* | 10/2012 | Edwards | G01G 19/4144 235/383 |
| 9,171,448 | B1 | 10/2015 | Foster | |
| 9,911,290 | B1* | 3/2018 | Zalewski | G06Q 30/0633 |
| 9,959,439 | B1* | 5/2018 | Lui | G06Q 10/0833 |
| 10,810,540 | B1* | 10/2020 | Gopal | G01G 19/42 |
| 10,949,723 | B2* | 3/2021 | Trivelpiece | G06K 19/0723 |
| 11,011,038 | B2* | 5/2021 | Bergman | G08B 13/246 |
| 2007/0239569 | A1 | 10/2007 | Lucas et al. | |
| 2008/0129461 | A1* | 6/2008 | Abraham | G06K 19/0723 340/10.1 |
| 2008/0182723 | A1* | 7/2008 | Aaron | A63B 24/0062 482/8 |
| 2008/0249899 | A1 | 10/2008 | Nasser | |
| 2012/0206449 | A1* | 8/2012 | Stark | G06Q 30/0281 345/419 |
| 2012/0287095 | A1* | 11/2012 | Cote | G06Q 10/08 345/204 |
| 2014/0167920 | A1* | 6/2014 | Kamiya | G06K 7/10366 340/10.1 |
| 2015/0012396 | A1* | 1/2015 | Puerini | G06Q 10/0875 705/28 |
| 2016/0055360 | A1* | 2/2016 | Haugarth | G06Q 30/0201 340/10.1 |
| 2017/0011606 | A1* | 1/2017 | Ceccon | G06Q 20/208 |
| 2017/0148005 | A1* | 5/2017 | Murn | G06Q 30/0631 |
| 2017/0161711 | A1 | 6/2017 | Chin et al. | |
| 2017/0228811 | A1* | 8/2017 | Moreau | G06Q 30/0224 |
| 2017/0300999 | A1 | 10/2017 | Wilkinson et al. | |
| 2018/0040219 | A1* | 2/2018 | Clark | G08B 13/2428 |
| 2018/0068258 | A1* | 3/2018 | Blumenau | G06Q 10/087 |
| 2018/0285812 | A1* | 10/2018 | Humphrys | G06Q 30/0639 |
| 2019/0080281 | A1* | 3/2019 | Tingler | G06Q 10/087 |
| 2019/0114889 | A1 | 4/2019 | Tam et al. | |
| 2019/0257024 | A1* | 8/2019 | Shin | D06F 58/30 |
| 2019/0279185 | A1* | 9/2019 | Cheng | B62B 3/1416 |

FOREIGN PATENT DOCUMENTS

| | | |
|---|---|---|
| JP | 2005-165819 A | 6/2005 |
| JP | 2005-250931 A | 9/2005 |
| JP | 2009-238025 A | 10/2009 |
| JP | 2010-094332 A | 4/2010 |
| JP | 2010-097458 A | 4/2010 |
| JP | 2010-218280 A | 9/2010 |
| JP | 2012-113661 A | 6/2012 |
| JP | 2013-037663 A | 2/2013 |
| TW | 201425200 A | 7/2014 |
| TW | 201624410 A | 7/2016 |
| TW | I570646 B | 2/2017 |

OTHER PUBLICATIONS

U.S. Office Action and PTO-892 for U.S. Appl. No. 16/495,162 dated Apr. 12, 2021.

Nikolova, Hristina, and Jeffrey J. Inman. "Shopper-Facing Retail Technology: A Retailer Adoption Decision Framework Incorporating Shopper Attitudes and Privacy Concerns." Research Gate, Feb. 13, 2017, www.researchgate.net/publication/313731222_Shopper-Facing_Retail_Technology_A_Retailer_Adoption_Decision_Framework_.

Japanese Office Action for JP Application No. 2017-056147 dated Mar. 16, 2021 with English Translation.

International Search Report for PCT/JP2018/009955, dated Apr. 24, 2018.

Office Action dated Oct. 27, 2020 in U.S. Appl. No. 16/495,162.

Communication dated Apr. 22, 2020, from the Intellectual Property Office of Taiwan in Application No. 107108739.

International Search Report for PCT/JP2018/009931 dated, Apr. 24, 2018 (PCT/ISA/210).

U.S. Office Action for U.S. Appl. No. 16/495,162 dated Aug. 3, 2021.

* cited by examiner

PRODUCT MANAGEMENT DEVICE, CONTROL METHOD FOR PRODUCT MANAGEMENT DEVICE, AND PROGRAM

CROSS REFERENCE TO RELATED APPLICATIONS

This application is a National Stage of International Application No. PCT/JP2018/009955 filed Mar. 14, 2018, claiming priority based on Japanese Patent Application No. 2017-056151 filed Mar. 22, 2017, the content of which is incorporated herein by reference.

TECHNICAL FIELD

The present invention relates to a product management device, a method of controlling the product management device, and a program.

BACKGROUND ART

In recent years, the trend in unmanned systems has strengthened in response to the demand for reduction in labor costs in stores such as convenience stores and technical development therefor has been carried out. Since clerks do not perform settlement for products in such unmanned stores, various settlement methods need to be devised and thus intensive research thereon has been conducted.

For example, Patent Document 1 discloses a technology for performing settlement for product purchase on the basis of weights in a technique of product purchaser reading information such as product prices using a product reading means such as a barcode reader.

In this Patent Document 1, first, a product purchaser puts a shopping basket containing products planned to be purchased on a weight measurement means provided in a front part of a product reading means and measures the weight of the shopping basket before reading.

Next, the product purchaser takes the products out of the shopping basket and reads the products through the product reading means. Accordingly, price data and weight data of the products are acquired and a cumulative price and a cumulative weight of the purchased products are calculated.

Then, the product purchaser puts the products which have been read by the product reading means into the shopping basket on a weight measurement means provided in a rear part and measures the weight of the shopping basket after reading.

Then, the gross weight of the products identified and calculated through the product reading means is compared with the weight of the shopping basket after the products have been read, for example, and if they do not correspond to each other, all the products have not been read. It is disclosed that when they do not correspond to each other, the product purchaser is notified of this and reading of all the products is promoted.

CITATION LIST

Patent Literature

Patent Document 1

Japanese Unexamined Patent Application, First Publication No. 2005-250931

SUMMARY OF INVENTION

Problem to be solved by the Invention

However, when unmanned stores spread, there will be no visual checking of clerks. Accordingly, there is a problem that which product in a product display rack has been picked up by a product purchaser cannot be detected in unmanned stores.

In addition, in the technology disclosed in Patent Document 1, when all products have not been read due to an erroneous operation of the reading means and the like during settlement, the occurrence of the erroneous operation can be informed of but reference information for identifying products which have not been read is not presented. Accordingly, all products need to be read again, which is inconvenient.

Accordingly, an object of the present invention is to provide a product management device capable of ascertaining which product has been picked up by a product purchaser even in an unmanned store and presenting reference information for identifying a product which has not been read even when all products have not been read due to an erroneous operation of a reading means, and the like during settlement.

Means for Solving the Problem

The present invention devised to solve the above-described problems employs the following configurations in order to achieve the aforementioned object.

A product management device according to one embodiment of the present invention includes a reception state storage unit configured to, on the basis of changes in reception states of signals transmitted from tag devices attached to products, store identification information of products in which the changes have occurred, and a list output unit configured to output a list of products for which the changes in the reception states are equal to or greater than a threshold value.

In addition, according to one embodiment of the present invention, in a method of controlling a product management device including a reception state storage unit configured to, on the basis of changes in reception states of signals transmitted from tag devices attached to products, store identification information of products in which the changes have occurred, and a list output unit configured to output a list of the products, the method includes controlling the list output unit such that a list of the products for which the changes in the reception states are equal to or greater than a threshold value is output.

A program according to one embodiment of the present invention causes a computer of a product management device to perform process, the product management device including a reception state storage unit configured to, on the basis of changes in reception states of signals transmitted from tag devices attached to products, store identification information of products in which the changes have occurred, and a list output unit configured to output a list of the products, the process includes controlling the list output unit such that a list of the products for which the changes in the reception states are equal to or greater than a threshold value is output.

Advantageous Effects of Invention

According to the present invention, it is possible to ascertain which product has been picked up by a product purchaser even in an unmanned store and to present reference information for identifying a product which has not been read even when all products have not been read due to an erroneous operation of a reading means, and the like during settlement.

DESCRIPTION OF EMBODIMENTS

First Embodiment

<Product Management Device>

Figure 1:
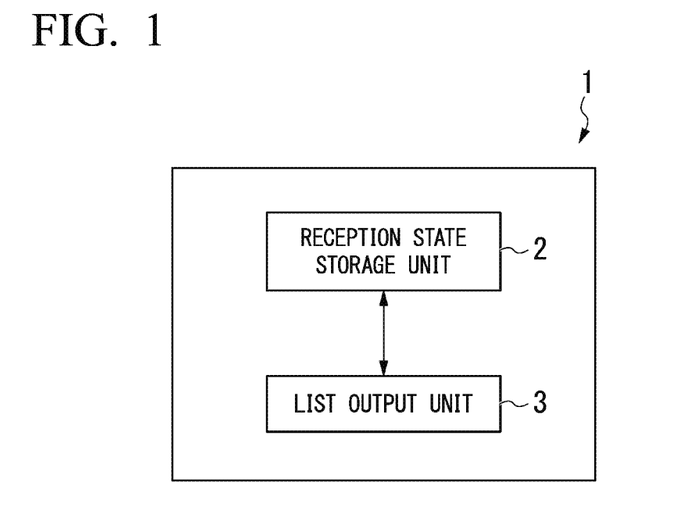
FIG. 1 is a diagram showing a product management device according to a first embodiment.

First, a product management device 1 according to a first embodiment will be described. The product management device 1 according to the first embodiment includes a reception state storage unit 2 and a list output unit 3, as shown in FIG. 1.

The reception state storage unit 2 is a functional unit which, on the basis of changes in reception states of signals transmitted from tag devices attached to products, stores product identification information of the products in which the changes have occurred.

As a tag device, a radio frequency identifier (RFID) tag and the like may be exemplified. An RFID tag includes an IC chip having a memory in which product identification information has been stored and an antenna coil.

In addition, as a reception state of a transmitted signal, a received signal strength indicator (RSSI) value (received strength) and the like can be exemplified.

A change in a reception state of a signal transmitted from a tag device attached to a product occurs when, for example, a product purchaser physically moves the product by picking the product up, and the like.

The list output unit 3 is a functional unit which outputs a list of products for which reception states changes are equal to or greater than a threshold value.

<Method of Controlling Product Management Device>

In the present embodiment, the list output unit 3 is controlled such that a list of products for which reception state changes are equal to or greater than the threshold value in the product management device 1 is output.

For example, when an RFID tag is used as a tag device, an RSSI value may also slightly change even if a product is not physically moved. Accordingly, it is determined whether a reception states change is equal to or greater than the threshold value. That is, the present embodiment requires a reception state change to be equal to or greater than the threshold value in order to determine that the product has been moved.

Reception state changes also include a case in which a state in which reception has been being performed is changed to a state in which reception has not been performed. This is because it is conceivable that a product may have been moved from a location at which reception is possible to a location at which reception is not possible in this case.

In the present embodiment, it is possible to consistently monitor reception states of signals transmitted from tag devices attached to products and output a list of products for which reception states have changed by the threshold value or more. Because the reception states have changed by the threshold value or more, the products output as a list can be regarded as physically moved products.

Accordingly, it is possible to ascertain which product has been picked up by a product purchaser even in an unmanned store.

Therefore, it is possible to obtain marketing information about consumer trends which indicates not only actually purchased products but also products that have not been actually purchased but have been picked up and have drawn attention.

In addition, according to the present embodiment, a list of products is also presented when RFID tags of all products planned to be purchased have not been read due to an erroneous operation of an RFID reader, and the like during settlement. Accordingly, a product purchaser can easily identify products which have not been read.

That is, a product identified on the basis of a reception state change is a physically moved product. Accordingly, a product identified on the basis of a reception state change is a product which is highly probably contained in a shopping basket.

Therefore, products which have already been read through the RFID reader are excluded from the list of products for which reception states have changed by the threshold value or more. Accordingly, it becomes possible to provide a list of products which are very likely to be contained in a shopping basket during settlement and have not been read through the RFID reader.

Therefore, a product purchaser can easily identify a product which has not been read by searching the shopping basket for the products in the product list.

Second Embodiment

<Product Management Device>

Next, a product management device according to a second embodiment of the present invention will be described.

Figure 2:
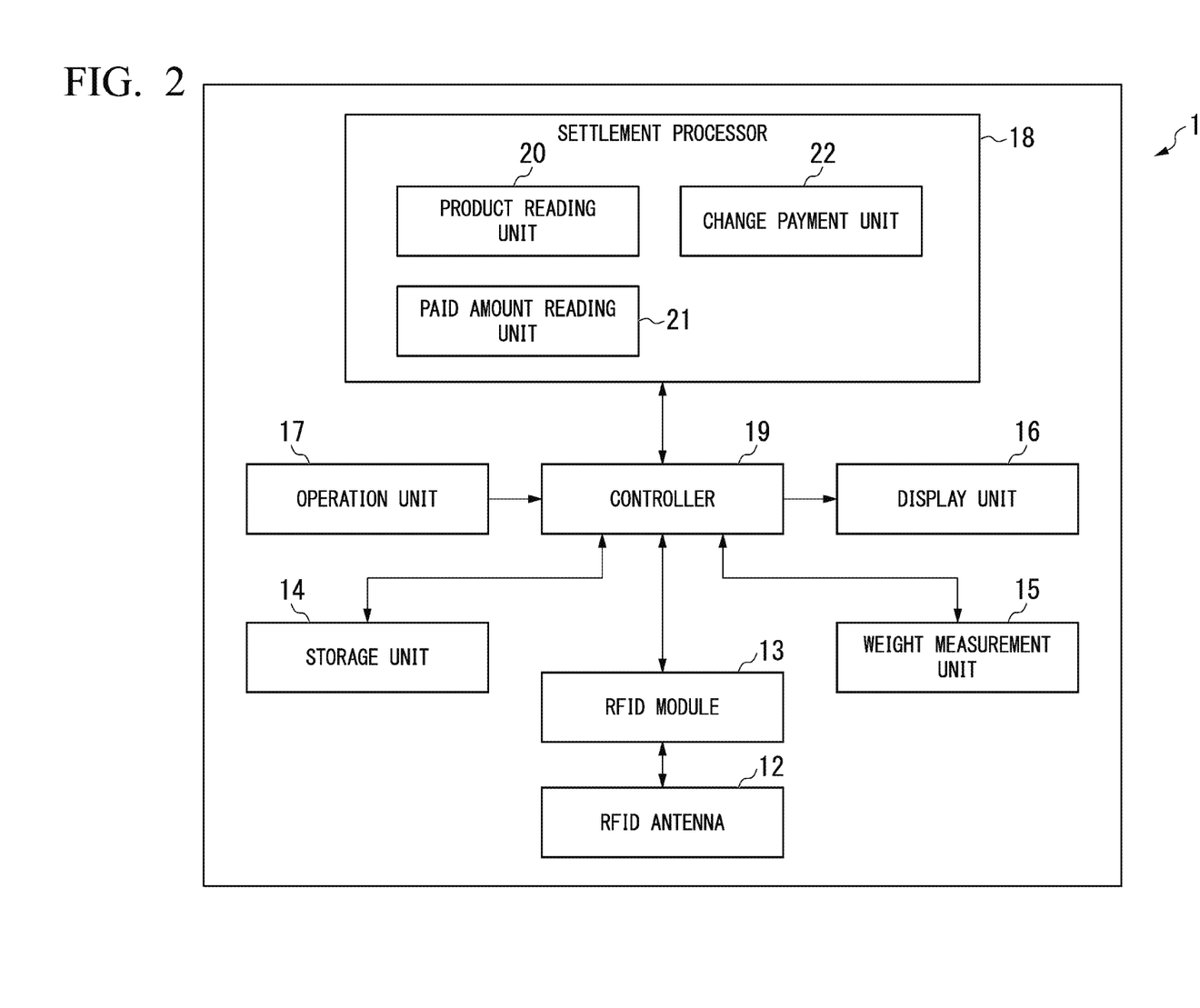
FIG. 2 is a diagram showing a product management device according to a second embodiment.

FIG. 2 is a diagram showing a product management device 11 according to the second embodiment according to the present invention. The product management device 11 of the second embodiment includes an RFID antenna 12, an RFID module 13, a storage unit 14, a weight measurement unit 15, a display unit 16, an operation unit 17, a settlement processor 18, and a controller 19, as shown in FIG. 2.

The RFID antenna 12 is an antenna which takes charge of transmitting/receiving radio waves to/from RFID tags attached to products and receives signals transmitted from the RFID tags attached to the products. In addition, the RFID module 13 reads product identification information and RSSI values from signals received by the RFID antenna and outputs these to the controller 19.

It is desirable that a plurality of RFID antennas 12 be installed on the ceiling, product racks and the like of a store at predetermined intervals.

The storage unit 14 stores various types of information about products. Specifically, the storage unit 14 stores product identification information, product names, weights of products, RSSI values, RFID antenna numbers of RFID antennas that have received signals transmitted from RFID tags, and the like.

In addition, the storage unit 14 outputs such information to the controller 19 or stores such information on the basis of an instruction of the controller 19.

An RFID antenna number is a number for individually identifying an RFID antenna, and one number is assigned to one antenna.

The weight measurement unit 15 includes a weight sensor and the like, for example. The weight measurement unit 15 measures the weights of products planned to be purchased by a product purchaser and outputs the measurement results to the controller 19. As a specific measurement method, for example, a method of weighing a shopping basket containing products planned to be purchased as it is through the weight sensor may be conceived.

The display unit 16 includes a display device such as a liquid crystal panel, for example, and displays various types of information on the basis of output from the controller 19.

The operation unit 17 detects various operations performed by a product purchaser and outputs operation signals according to the operations to the controller 19.

The settlement processor 18 is a functional unit which includes a product reading unit 20, a paid amount reading unit 21 and a change payment unit 22 and performs a settlement process for products. The product reading unit 20 has an RFID reader for reading product identification information from an RFID tag attached to each product, and the like, for example. The product reading unit 20 outputs the read product identification information to the controller 19. Although the RFID reader can read RFID tags of all products contained in a shopping basket at a time, the RFID reader may not read RFID tags for some products depending on a positional relationship.

Further, the paid amount reading unit 21 reads an amount of money paid by a product purchaser and outputs the read amount of money to the controller.

In addition, the change payment unit 22 pays change to the product purchaser on the basis of an instruction from the controller 19.

The controller 19 is a functional unit which receives various outputs from the RFID module 13, the storage unit 14, the weight measurement unit 15, the display unit 16, the operation unit 17, the product reading unit 20, the paid amount reading unit 21 and the change payment unit 22 or transmits various instructions to these components. Further, the controller 19 is a functional unit which performs various computation processes. Specific processes performed by the controller 19 will be described later.

<Method of Controlling Product Management Device>

Figure 3:
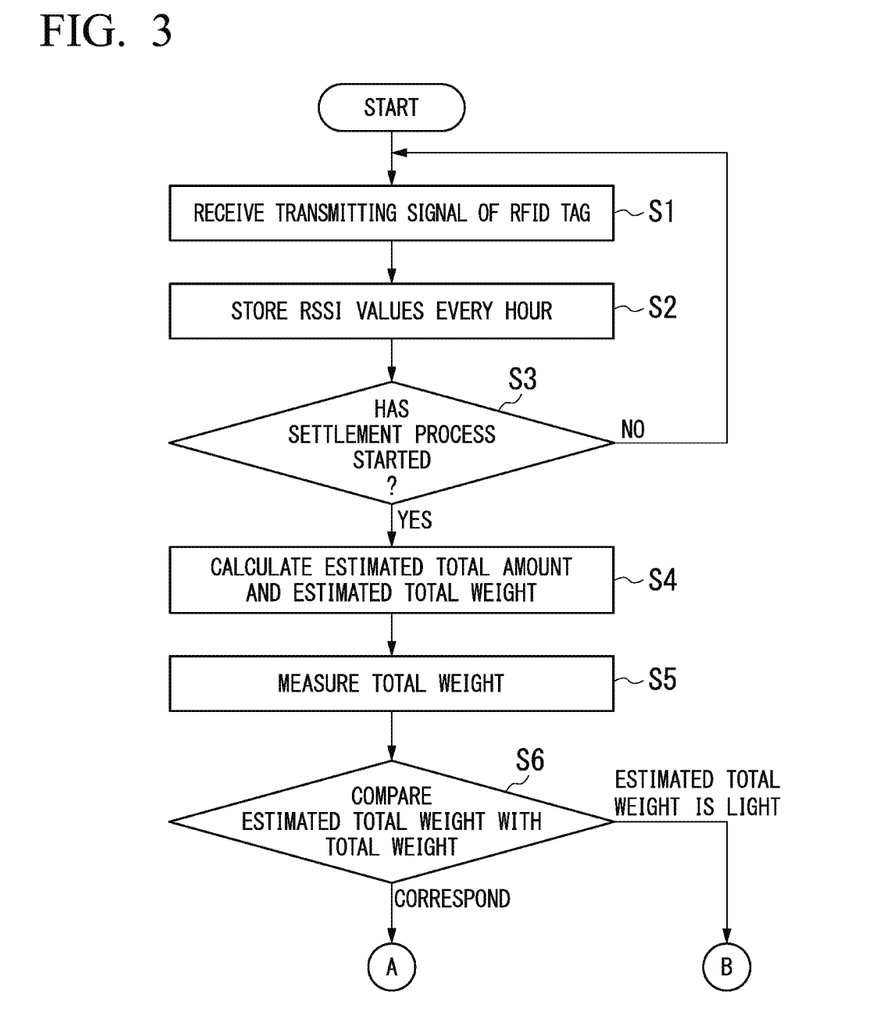
FIG. 3 is a first flowchart showing a method of controlling the product management device according to the second embodiment.

Next, a method of controlling the product management device 11 of the present embodiment will be described using FIG. 3. FIG. 3 is a first flowchart showing a method of controlling the product management device 11 according to the second embodiment.

(Step S1)

First, transmitting signals transmitted from RFID tags are received with respect to all products in a store at a suitable timing such as when a product purchaser enters the store.

Specifically, the RFID antennas 12 receive a transmitting signal transmitted from an RFID tag attached to each product. Then, the RFID module 13 reads product identification information and RSSI values from radio waves received by the RFID antennas 12 and outputs RFID antenna numbers along with the product identification information and the RSSI values to the controller 19 on the basis of an instruction of the controller 19.

A detection means for detecting that the product purchaser enters the store may be provided.

(Step S2)

Next, the controller 19 outputs product identification information, RSSI values and RFID antenna numbers input in step S1 to the storage unit 14 at specific time intervals. The storage unit 14 stores the information and the time when this information has been acquired for each piece of product identification information.

As the specific time, an arbitrary period can be set. It is preferable to set a short period because it is desirable to continuously check RSSI values.

(Step S3)

Next, whether the product purchaser has started a settlement process is checked. As a checking method, for example, it is possible to check whether the product purchaser has put a shopping basket on the weight measurement unit 15 or to check whether the product purchaser has performed an input operation for starting the settlement process using the operation unit 17.

Further, when the product purchaser has not started the settlement process (NO in step S3), the procedure returns to step S1.

(Step S4)

When the settlement process has been started in step S3 (YES in step S3), subsequently, an estimated total amount and an estimated total weight of products planned to be purchased are calculated.

Specifically, the product reading unit 20 reads product identification information for each product by reading RFID tags attached to products contained in the shopping basket through the RFID reader. Then, the product reading unit 20 outputs the read product identification information to the controller 19.

In addition, the controller 19 identifies products stored in the storage unit 14 on the basis of the product identification information and acquires the prices and weights of the products. The controller 19 calculates an estimated total amount and an estimated total weight of all products planned to be purchased on the basis of the prices and weights of the identified products.

(Step S5)

Next, the gross weight of the products planned to be purchased is measured.

Specifically, the weight measurement unit 15 on which the shopping basket is placed measures the total weight of the products planned to be purchased by measuring the weight of the shopping basket. In addition, the weight measurement unit 15 outputs the measurement results to the controller 19.

(Step S6)

Next, the controller 19 compares the estimated total weight calculated in step S4 with the total weight measured in step S5.

Regarding the result of comparison, the estimated total weight is quite unlikely to be greater than the total weight although it may be less than the total weight. In reading through the RFID reader, all products may not be read depending on locations of RFID tags and the like. Further, the weight measurement unit 15 can measure the weights of all products in the shopping basket. Accordingly, the estimated total weight read and calculated by the RFID reader is always equal to or less than the weight measured by the weight measurement unit 15.

(Step S7)

Figure 4:
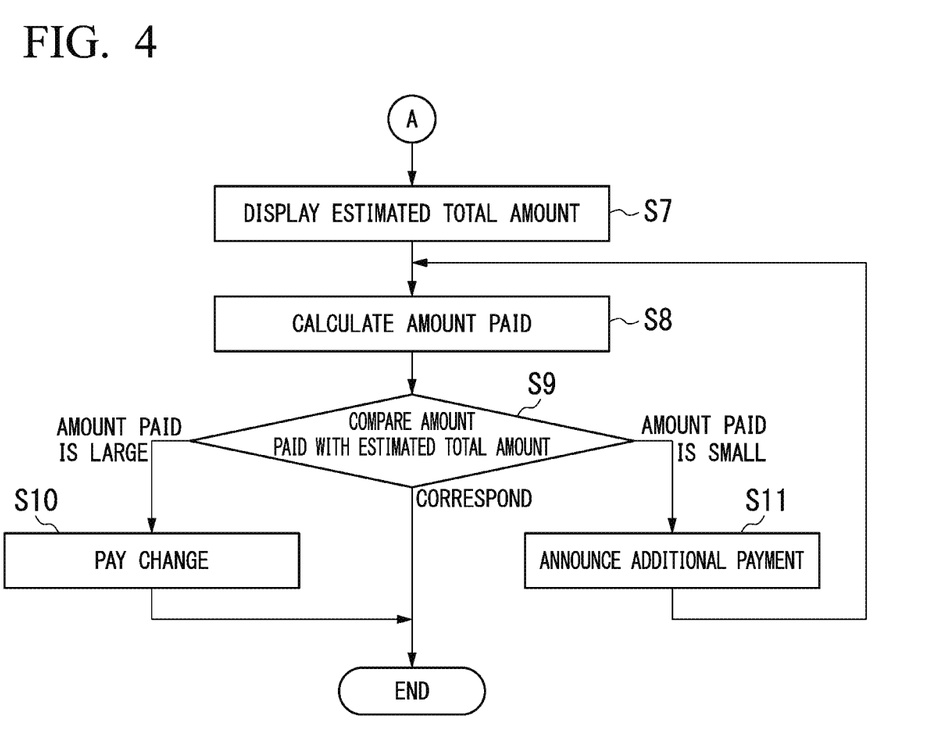
FIG. 4 is a second flowchart showing the method of controlling the product management device according to the second embodiment.

When the result of comparison in step S6 is that the estimated total weight and the measured total weight correspond, a settlement procedure of a payment is performed. The settlement procedure of the payment will be described using the flowchart of FIG. 4. FIG. 4 is a second flowchart showing the method of controlling the product management device 11 according to the second embodiment.

Specifically, the controller 19 outputs the estimated total amount calculated in step S4 to the display unit 16, as shown in FIG. 4. The display unit 16 displays the estimated total amount on the display device on the basis of an instruction of the controller 19.

(Step S8)

Next, when the product purchaser puts money into the paid amount reading unit 21, the paid amount reading unit 21 reads the type and amount of the payment. Then, the paid amount reading unit 21 outputs information about the read amount of money to the controller 19. The controller 19 calculates the amount paid on the basis of the information about the read amount of money.

(Step S9)

Next, the controller 19 compares the amount paid calculated in step S8 with the estimated total amount calculated in step S4.

When the amounts correspond to each other, the present control method ends.

(Step S10)

When the result of comparison in step S9 is that the amount paid calculated in step S8 is greater than the estimated total amount calculated in step S4, the controller 19 calculates a difference between the amount paid and the estimated total amount. The controller 19 instructs the change payment unit 22 to pay the difference as the change. Then, the change payment unit 22 pays the change according to the instruction from the controller 19 and the present control method ends.

(Step S11)

When the result of comparison in step S9 is that the amount paid calculated in step S8 is less than the estimated total amount calculated in step S4, the controller 19 instructs the display unit 16 to announce additional payment. The display unit 16 displays an announcement of additional payment on the display device on the basis of the instruction from the controller 19. Thereafter, the product purchaser makes additional payment. Accordingly, the procedure returns to step S8.

(Step S12)

Figure 5:
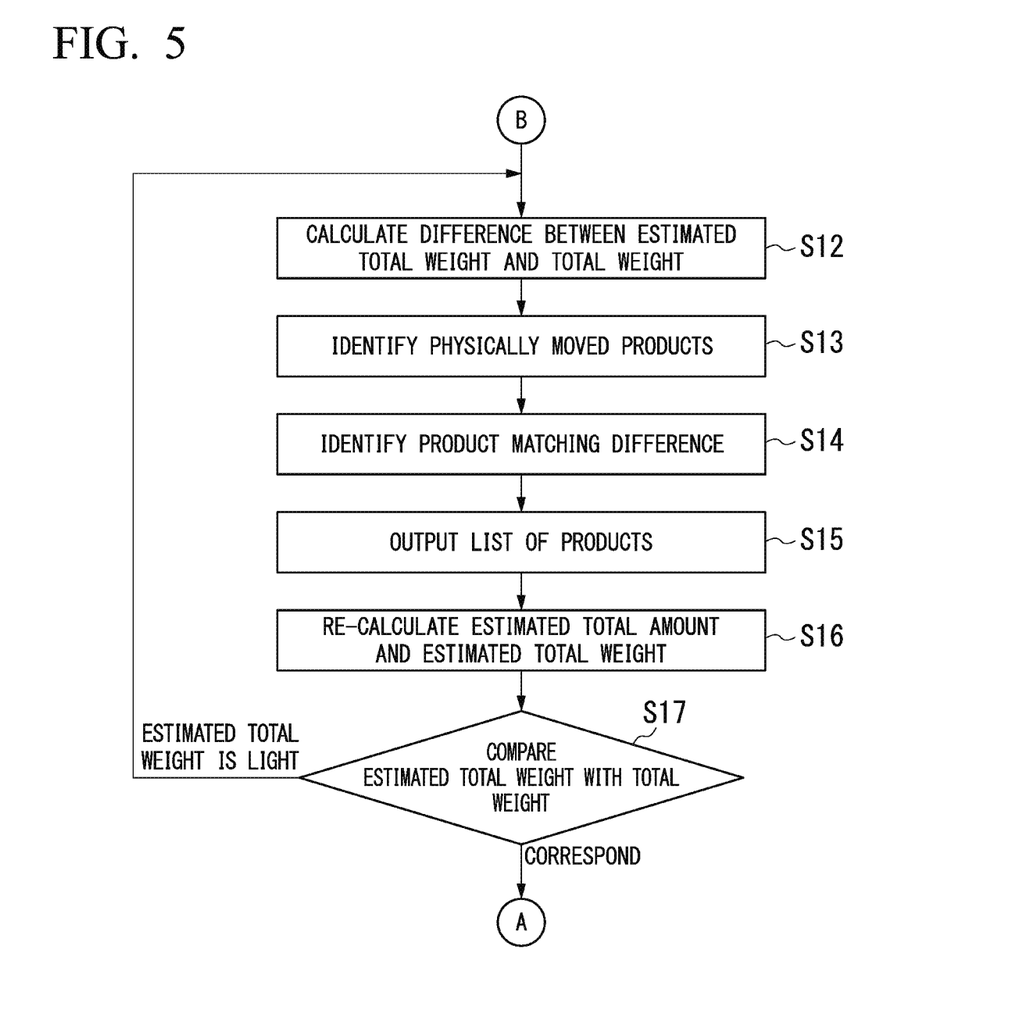
FIG. 5 is a third flowchart showing the method of controlling the product management device according to the second embodiment.

FIG. 5 is a third flowchart showing the method of controlling the product management device 11 according to the second embodiment. When the result of comparison between the estimated total weight and the total weight in step S6 (FIG. 3) is that the estimated total weight is less than the total weight, an operation of outputting a list of products is started. Here, a case in which the estimated total weight is less than the total weight means that the RFID reader has not read all products in the shopping basket due to locations of RFID tags of products, and the like. In this case, products with RFID tags which have not been read are read again. The reason why the list of products is output in step S15 which will be described later is that reference information for identifying products to be read again is provided to the product purchaser.

Specifically, first, the controller 19 calculates a difference between the estimated total weight calculated in step S4 and the total weight measured in step S5, as shown in FIG. 5.

(Step S13)

Next, the controller 19 identifies a product whose RSSI value has changed by a threshold value or more and a product whose RFID antenna number has changed, among the products stored in the storage unit 14. That is, the controller 19 identifies physically moved products.

If the product has not physically moved, the RSSI value of a product does not change by the threshold value or more. Accordingly, a product whose RSSI value has changed by the threshold value or more can be regarded as a physically moved product.

In addition, if a product which has not been moved, the RFID antenna 12 which receives a signal transmitted from an RFID tag does not change. Accordingly, a product whose RFID antenna number has changed can be regarded as a physically moved product.

In this manner, products identified in step S13 can be regarded as physically moved products.

(Step S14)

Next, the controller 19 identifies, on the basis of the difference calculated in step S12, products that are consistent with the difference among the products identified in step S13.

A product that is consistent with the difference may be a product having a weight that corresponds the difference or a plurality of products having a total weight that corresponds the difference. Further, a product that matches the difference may be all products having weights equal to or less than the difference.

For example, a case in which the difference is 500 g may be exemplified. In this case, a product having a weight of 500 g may be identified or a plurality of products having a total weight of 500 g (for example, a 200 g product and a 300 g product) may be identified among products identified in step S13. Otherwise, all products having weights equal to or less than 500 g may be identified.

In this manner, the controller 19 identifies a product corresponding to the difference between the estimated total weight and the total weight among from products whose RSSI values have changed by the threshold value or more. That is, the controller 19 identifies a product corresponding to the difference among from products determined to have physically moved.

(Step S15)

Next, the controller 19 outputs information on products obtained by excluding the products identified in step S4 from products identified in step S14 to the display unit 16. That is, the controller 19 outputs information on products obtained by excluding products whose RFID tags have been read in the shopping basket from one or a plurality of products identified on the basis of the difference. That is, the controller 19 excludes the products whose RFID tags have been read from candidates for products whose RFID tags have not been read. Then, the display unit 16 displays the corresponding products as candidates for products whose RFID tags have not been read by the RFID reader on a liquid crystal device (display device) as a list on the basis of the output from the controller 19.

The reason why the products identified in step S4 are excluded is that promoting the product purchaser to re-read products whose RFID tags have already been read is pointless.

(Step S16)

Next, an estimated total amount and an estimated total weight of the products planned to be purchased are calculated again.

Specifically, the product purchaser performs an appropriate operation on the basis of the product list displayed in step S15 such that the products identified from among the products contained in the shopping basket are read by the RFID reader. For example, the operation is an operation for changing the locations of the RFID tags of the products, and the like.

Then, the product reading unit 20 reads product identification information from the RFID tags of the products and outputs the read product identification information to the controller 19.

The controller 19 identifies corresponding products stored in the storage unit 14 on the basis of the product identification information and acquires the prices and weights of the products. In addition, the controller 19 re-calculates the estimated total amount and the estimated total weight of the product planned to be purchased by adding the prices and weights of the newly read products to the estimated total amount and the estimated total weight calculated in step S4. (Step S17)

Next, the estimated total weight re-calculated in step S16 is compared with the total weight measured in step S5.

When the result of comparison is that the two correspond to each other, the procedure proceeds to step S7 (FIG. 4). On the other hand, when the estimated total weight re-calculated in step S16 is less than the total weight measured in step S5, the procedure returns to step S12. This case represents that products whose RFID tags have not been read remain. Accordingly, the processes of step S12 to step S16 are performed.

As described in step S6, there are no cases in which the re-calculated estimated total weight is greater than the total weight measured instep S5.

According to the above-described product management device 11 and the method of controlling the product management device 11 of the present embodiment, it is possible to ascertain which product has been picked up by a product purchaser even in an unmanned store as in the first embodiment.

In addition, when the RFID reader has not read RFID tags of all products planned to be purchased during settlement, a list of products is also presented. Accordingly, the product purchaser can easily identify products which have not been read.

Furthermore, a list of products is presented to a product purchaser on the basis of a difference between a calculated estimated total weight and an actually measured total weight in the present embodiment. For example, a product corresponding to weight difference is identified and displayed from among products for which reception states have changed by a threshold value or more, on the basis of the weight difference in the present embodiment. That is, a product whose RFID tag has not been read is identified among from products for which reception states have changed by the threshold value or more on the basis of the difference. Accordingly, it is possible to limit the number of products which are included in the list presented to the product purchaser to identify products which have not been read out of a shopping basket more easily.

In addition, after a product purchaser enters a store, RSSI values are read. Accordingly, only products having RSSI values which have changed while the product purchaser is in the store can be presented to the product purchaser as a list of products. Accordingly, it is possible to limit the number of products included in the list presented to the product purchaser to identify products which have not been read out of a shopping basket more easily.

Although the present invention has been described on the basis of embodiments, the present invention is not limited to the aforementioned embodiments and can be modified in various manner without departing from the spirit or scope of the present invention.

For example, in the aforementioned second embodiment, when the estimated total weight is less than the total weight, identification of a product corresponding to the difference from physically moved products on the basis of RSSI values has been described. However, control may be performed such that physically moved products are continuously identified irrespective of a result of comparison between the estimated total weight and the total weight.

The product management devices 1 and 11 in the aforementioned embodiments include a computer system. In addition, a program for causing each process in the above-described product management devices to be performed is stored in a computer-readable recording medium of the product management devices, and the process is performed by a computer of a server device reading and executing the program. Here, the computer-readable recording medium refers to a magnetic disk, a magneto-optic disk, a CD-ROM, a DVD-ROM, a semiconductor memory or the like. Further, this computer program may be delivered to a computer through a communication line and the computer which has received the delivery may execute the program.

Moreover, the aforementioned program may be a program for realizing some of functions of the above-described processing units. Further, the program may be a so-called difference file (difference program) which can be realized by combining the above-described functions with a program which has already been recorded in a computer system.

INDUSTRIAL APPLICABILITY

According to the present invention, it is possible to ascertain which product has been picked up by a product purchaser even in an unmanned store and to present reference information for identifying products which have not been read when all products have not been read due to an erroneous operation of a reading means during settlement.

REFERENCE SIGNS LIST 1, 11 Product management device
2 Reception state storage unit
3 List output unit
12 RFID antenna
13 RFID module
14 Storage unit
15 Weight measurement unit
16 Display unit
17 Operation unit
18 Settlement processor
19 Controller
20 Product reading unit
21 Paid amount reading unit
22 Change payment unit

The invention claimed is:

1. A product management device comprising:
a computer; and
a memory storing executable instructions that, when executed by the computer, causes the computer to perform as:
a reception state storage unit configured to, on the basis of changes in reception states of signals transmitted from tag devices attached to products, store identification information of products in which the changes have occurred; and a list output unit configured to output a list of products for which the changes in the reception states are equal to or greater than a threshold value,
wherein the reception state storage unit stores the identification information of the products in which the reception state changes have occurred when a product purchaser enters a store.

2. The product management device according to claim 1, wherein the list output unit calculates a first total weight on the basis of transmitting signals transmitted from the tag devices attached to the plurality of products during settlement and identifies identification information of the products in the list from identification information of the products for which the changes in the reception states are equal to or greater than the threshold value on the basis of a difference between a second total weight obtained by measuring the plurality of products and the first total weight.

3. The product management device according to claim 1, wherein the reception states are RSSI values.

4. A method of controlling a product management device including a reception state storage unit configured to, on the basis of changes in reception states of signals transmitted from tag devices attached to products, store identification information of products in which the changes have occurred, and a list output unit configured to output a list of the products, the method comprising:

controlling the list output unit such that a list of the products for which the changes in the reception states are equal to or greater than a threshold value is output,
wherein the reception state storage unit stores the identification information of the products in which the reception state changes have occurred when a product purchaser enters a store.

5. A non-transitory computer-readable recording medium storing a program causing a computer of a product management device to perform process, the product management device including a reception state storage unit configured to, on the basis of changes in reception states of signals transmitted from tag devices attached to products, store identification information of products in which the changes have occurred, and a list output unit configured to output a list of the products, the process comprising:

controlling the list output unit such that a list of the products for which the changes in the reception states are equal to or greater than a threshold value is output,
wherein the reception state storage unit stores the identification information of the products in which the reception state changes have occurred when a product purchaser enters a store.

* * * * *